United States Patent [19]

Bhattacharjee et al.

[11] Patent Number: 5,055,509
[45] Date of Patent: Oct. 8, 1991

[54] PROCESS FOR ENHANCING THE COMPATIBILITY OF POLYAMIDE AND POLYESTER IN BLENDS

[75] Inventors: H. R. Bhattacharjee, Randolph; Y. P. Khanna, Cedar Knolls; R. Kumar, Budd Lake; J. J. Belles, Jr., Morristown, all of N.J.

[73] Assignee: Allied-Signal Inc., Morristown, N.J.

[21] Appl. No.: 339,572

[22] Filed: Apr. 17, 1989

[51] Int. Cl.$^5$ .......................... C08K 5/51; C08L 67/02
[52] U.S. Cl. .................................... 524/136; 524/128; 525/425
[58] Field of Search .......................... 524/136; 525/425

[56] References Cited

U.S. PATENT DOCUMENTS

| 3,509,107 | 4/1970 | Brignac | 260/78 |
| 3,551,548 | 12/1970 | Brignac et al. | 264/234 |
| 3,763,113 | 10/1973 | Burrows et al. | 260/78 |
| 4,390,667 | 6/1983 | Aharoni et al. | 525/420 |
| 4,391,956 | 7/1983 | Scheetz | 525/425 |
| 4,417,031 | 11/1983 | Aharoni et al. | 525/425 |
| 4,417,032 | 11/1983 | Khanna et al. | 525/432 |
| 4,906,708 | 3/1990 | Bhattacharjee et al. | 525/420 |

FOREIGN PATENT DOCUMENTS

| 084643 | 12/1982 | European Pat. Off. . |
| 2172162 | 9/1973 | France . |
| 2355865 | 1/1978 | France . |
| 569184 | 5/1945 | United Kingdom . |

OTHER PUBLICATIONS

Nishi Nori et al., "Polymerization of Amino-acids or Peptides with Diphenyl Phosphoryl Azide (DPPA)", *Int. J. Biol. Macromol.*, vol. 2, p. 53 (1980).

S. Takayuki et al., "Diphenylphosphoryl Azide. A New Convenient Reagent for a Modified Curtius Reaction and for the Peptide Synthesis", *J. of the American Chemical Society*, vol. 94, pp. 6203-6205 (1972).

*Primary Examiner*—Ana L. Carrillo
*Attorney, Agent, or Firm*—R. C. Stewart, II; G. H. Fuchs; D. L. Webster

[57] ABSTRACT

A process for enhancing the compatibility of polyester and polyamide in blends by adding thereto an effective amount of an aryl phosphoryl azide compound as for example diphenyl phosphoryl azide, and thereafter heating the composition until the desired enhancement in compatibility is obtained as evidenced by a lower of the individual melting points of the polyester and polyamide in the blend.

23 Claims, No Drawings

PROCESS FOR ENHANCING THE COMPATIBILITY OF POLYAMIDE AND POLYESTER IN BLENDS

BACKGROUND OF THE INVENTION

1. Field of the Invention

This invention relates to a process for enhancing the compatibility of polyester and polyamide blends. More particularly, this invention relates to such a process in which the enhanced compatibility is effectuated by the addition of an effective amount of one or more aryl phosphoryl azide compounds to the blend. Polyamide/polyester blends treated in accordance with the process of this invention are capable of being fabricated into useful shaped articles of manufacture, e.g., filaments, both mono- and multifilament, films, tapes, ribbons, rods, laminates, and the like.

2. Description of the Prior Art

Polyamides, polyesters and polyamide/polyester blends are disclosed in the prior art as having many and varied uses in industrial and commercial applications. For example, these polymers can be formed in filaments in which the polymer chains are oriented along the filament axis. Such filaments have many uses, in commercial applications as for example in the production of fibers for tire cord, textiles and the like. Similarly, these polymers can be fabricated into other useful shaped articles, as for example, gears, lawn mower housings, skate boards and the like.

Several processes have been proposed in the prior art for improving the properties or polyesters and polyamides. One such method is set forth in U.S. Pat. No. 3,763,113 which discloses a method for increasing the molecular weight of polyamides having recurring -CONH-alkylene-NHCO-alkylene units, such as poly(hexamethylene adipamide) by heating the polyamide with a phosphoric acid derivative in the presence of an inert gas, such as nitrogen. Similarly, U.S. Pat. Nos. 3,551,548 and 3.763,113, each broadly describes a method for increasing the relative viscosity of polyamides in general, and poly(hexylmethyleneadipamide), specifically, by sweeping a molten mixture of the polyamide and phosphorous compound with an inert gas.

Each of these processes provides various adverse effects. For example, in each of the processes an inert gas is employed, which in high concentrations causes uneven finishing, i.e. a variation in the degree of polymerization, throughout the polyamide, which results in a non-uniform polymer. Furthermore, inert gas is expensive, and requires additional equipment and monitoring which can increase the cost of commercialization of the process, even though the inert gas is used in small amounts.

U.S. Pat. No. 4,417,032 discloses a process for forming quasi-random copolymers from two or more homo polyamides. In this process, the homo polyamides are melt blended in the presence of a phosphite promoter, U.S. Pat. No. 3,509,107 discloses a process for increasing the relative viscosity of polyamide fibers or copolyamides by incorporating a phosphorous or phosphite compound into the polyamide under an inert gas atmosphere The primary object of U.S. Pat. No. 3,509,107 is to provide a process for increasing the viscosity of polyamide yarn and cord which requires a minimum amount of gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569,184 discloses a method for producing a random copolymer from nylon 6 and nylon 6,6. The invention described herein teaches that heating a mixture of nylon 6 and nylon 6,6 results in interchange between various sections of the respective polymer molecules with the final product being a random copolymer of nylon 6 and nylon 6,6. In order to produce a random copolymer of nylon 6 and nylon 6,6, British Patent No. 569,184 teaches that it is necessary to heat the mixture of homopolymers for periods of time up to 8 hr. at 285° C. without any catalyst.

U.S. Pat. No. 4,390,667 discloses a process for decreasing the melt index and increasing the viscosity of polyamide fibers via incorporating a phosphate compound into the polyamide and heating the polyamide until the desired changes in the melt index and viscosity occur. The phosphate utilized in U.S. Pat. No. 4,390,667 include substituted aryl phosphates which satisfy certain Hammett sigma values.

U.S. Pat. No. 4,417,031 discloses a process for preparing block and graft copolymers. The described process involves reacting two or more polyamides, polyesters, and homopolymers of β-unsaturated carboxylic acids in order to form a graft and/or block copolymer. Included in the patent are copolymers formed from poly(caproamide) and poly(hexamethylene adipamide).

Diphenyl phosphoryl azide has been used as a convenient reagent for racemization-free peptide synthesis and for polymerization of peptides such as β-alanine and L-alanylglycine. See for example, Nishi Nori et al. "Polymerization of Amino-acids or Peptides with Diphenyl Phosphoryl Azide (DPPA)", *Int. J. BiolMacromol.*, Vol. 2 pp. 53 (1980) and Shiori Takayuki et al., "Diphenylphosphoryl Azide. A New Convenient Regeant For A. Modified Curtius Reaction and for the Peptide Synthesis", *J. of The American Chemical Society*, Vol. 94 pp 6203–6205 (1972).

BRIEF DESCRIPTION OF THE INVENTION

In accordance with this invention, there is provided a process for enhancing the compatibility of one or more polyesters and one or more polyamides in a polyester/polyamide blend which comprises the steps of:

a. forming an intimate mixture of one or more polyesters, one or more polyamides, and an effective amount of one or more aryl phosphoryl azide compounds of the formula:

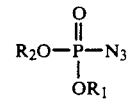

wherein:

$R_1$ is selected form the group consisting of phenyl or phenyl substituted with one or more substituents such as alkyl, alkoxy, phenoxy, phenyl, alkoxyalkyl, alkylphenyl, alkoxyphenyl, phenylalkyl, nitro, halo, sulfite and the like which are inert under process conditions: and $R_2$ is selected from the group consisting of $R_1$ substituents, alkyl, haloalkyl, hydrogen and metal and non-metal cations: and (b) heating said mixture for a period of time and at a temperature such that the melting point of said polyesters and said polyamides in said mixture becomes less than the melting point of said polyesters and said polyamides containing no aryl phosphoryl azide compounds heated at said temperature for said period of time.

As used herein, "an effective amount" is an amount of the aryl phosphoryl azide compounds which is effective to enhance the compatibility of one or more polyesters and one or more polyamides in a polyester/polyamide blend to any extent. As used herein "compatibility" is the degree to which the polyamides and polyesters chemically interact in the blend and an enhancement in compatibility is evidenced by a decrease in the melting point of the polyester and polyamides in the blend. Enhanced compatibility results in improved processability.

DETAILED DESCRIPTION OF THE INVENTION

The process of this invention is conveniently carried out in two steps. The first step of the process consists of forming an intimate mixture of one more polyesters, one or more polyamides and an effective amount of one or more aryl phosphoryl azide compounds of the formula:

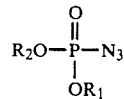

$$R_2O-\underset{OR_1}{\overset{\overset{O}{\|}}{P}}-N_3$$

wherein $R_1$ and $R_2$ are as defined above. IN the second step of the process, the intimate mixture is heated until the desired decrease in melting point is obtained.

In a preferred embodiments of this invention, a molten mixture is formed in the first process step. As used herein, "molten mixture" is an intimate mixture which has been heated to a temperature which is equal to or greater than the melting point of one of the polymeric components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of one or both of the polymeric components, and below the degradation temperature of the polymeric components. In a particularly preferred embodiment of this invention, the polymer mixture is heated above the melting point of one or both of the polymers in the mixture. An effective amount of one or more aryl phosphoryl azide compounds in liquid or powdered form, either near or diluted with a diluent such as cyclohexane, is added to the melted polymers while at the same time vigorously stirring the melt. Alternately, the one or more aryl phosphoryl azide compounds may be or added prior to melting and mixing. Heating is continued until the desired decrease in melting points has been obtained and it is thereafter cooled.

In the most preferred embodiment, the polymeric components are granulated, and the granulated components are mixed with one or more suitable aryl phosphoryl azide compounds in a suitable mixer, as for example, a tumbler or a Branbury Mixer, or the like, as uniformly as possible. Thereafter, the composition is dried in vacuum and is heated in an extruder until one or both of the polymer components are melted. As described above, the mixture is heated in the extruder until the desired decrease in melting point has been obtained, and it is thereafter expressed with cooling. It will be appreciated that the manner of mixing and heating of the polymers and aryl phosphoryl azide compounds is not critical and may be accomplished by other conventional methods known to those skilled in the art.

The order of mixing of the various components of the intimate mixture is not critical. Accordingly, the order of addition of the polymers, the aryl phosphoryl azide compounds, and other optional components to be described in more detail hereinbelow, to form the intimate mixture, can be varied as desired.

The process of this invention is preferably carried out in the absence of air, as for example, in the presence of an inert gas, such as argon, carbon dioxide, nitrogen or the like. The process can be carried out in a batchwise or discontinuous fashion, as for example, carrying out the process in a sealed container. Alternatively, the process can be carried out in a continuous fashion in a single processing zone, as for example, by use of an extruder as described hereinabove, or in a plurality of such reaction zones, in series or parallel.

Reaction temperature can be varied over a wide range. However, it should be appreciated that the process temperature employed in any specific instance will depend on the particular polyamide and polyester employed and, in the preferred embodiments should be at least as high as the melting point of the polyamide or polyester and below the degradation temperature of the polymers. In the preferred embodiments of this invention, the process temperature is such that the polymers will remain in the molten state as the melting point decreases to the desired levels. Normally, this can be accomplished in one or two ways. Either the process can be carried out at a temperature which is equal to or greater than the melting point of the desired product or process temperatures can be increased periodically over the course of the conduct of the process so as to maintain the mixture in the molten state. In the preferred embodiments of this invention in which the polyamide is polycaprolactam or poly(hexamethylene adipamide), and the polyester is polyethylene terephthalate the process temperature of the present invention can vary over a range between about 245° C. and about 315° C. More preferably, the process temperature should be maintained between about 265° C. and about 305° C., and most preferably the process should be carried out at a temperature of 290° C. to about 300° C. It will be appreciated that this invention and further experiments in regard to this invention have been conducted on a small laboratory scale. Therefore, it should be appreciated that if the invention were conducted on a larger industrial scale that some heat loss might occur. Consequently, an industrial practice of these preferred embodiments of present invention would possibly require that the extrusion vessel be heated to a temperature greater than about 290° C. to about 300° C. in order to obtain a reaction temperature of about 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogenous pressure.

The process is carried out for a time sufficient to obtain the desired decrease in the melting point of the mixture. Reaction times can be varied over a wide range. Usually, reaction times will depend on a variety of factors such as the polymeric components, reaction temperatures, the aryl phosphoryl azide compounds and its concentration, and other factors known to those of skill in the art to affect reaction times. In most instances, the reaction time can vary from a few minutes to 24 hr. or more. In the preferred embodiments of this invention, reaction times will vary from about 1 min. to about 2 hrs. and in the particularly preferred embodiments from about 2 min. to about 30 to 60 min.

Best results are obtained when the process of this invention is carried out in the presence of as little water as possible. Ideally, the conditions will be anhydrous, and this represents the most preferred embodiment of the invention. However, good results can be obtained when as much as 0.165 wt % water based on the total weight of the mixture is present therein. In the preferred embodiments, the wt % of water is less than about 0.1 wt %, and in the particularly preferred embodiments, the wt % of water is less than about 0.05 wt % on the same basis.

Aryl phosphoryl azide compounds for use in the practice of this invention are of the formula:

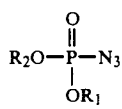

wherein $R_1$ and $R_2$ are as described above. Illustrative of useful compounds are those in which $R_1$ is an aryl substituent such as phenyl or substituted phenyl such as 2-aminophenyl, 3-aminophenyl, 2-benzyloxyphenyl, 3-benzyloxyphenyl, 4-benzyloxyphenyl, 2-bromophenyl, 3-bromo-5-chlorophenyl. 3-bromo-2,4-dimetrophenyl, 5-bromo-2-nitrophenyl, 2-butoxyphenyl, 3-chlorophenyl, 4-chloro-2,3-di-nitrophenyl, 2,4-dibromophenyl, 2,6-dichlorophenyl, 2,4-diiodophenyl,3,5-dimethoxyphenyl, 2-ethoxyphenyl, 4-ethoxyphenyl, 2,5-dinitrophenyl, 4-heptyloxyphenyl, 4-hexyloxyphenyl, 4-methyoxyphenyl, 4-methoxy-2-nitrophenyl, 4-octyloxy phenyl, 4-propoxyphenyl, 2,3,5-trichlorophenyl,2,3,5-triiodophenyl, 4-isobutylphenyl, 4-isopropyl-1-methylphenyl, 2-methoxy-4-propenylphenyl, 4-methyl-1,3,5-chlorophenyl, 4-pentylphenyl, 2-propylphenyl, 2,3,5,6-tetramethylphenyl, 3,5-di-tert-butylphenyl, 4-tert-butylphenyl, 3-isopropylphenyl, 2,4-dimethylphenyl, 2-methylcarbonyl phenyl and the like. The $R_2$ substituents can vary widely and include $R_1$ substituents alkyl and substituted alkyl groups such as tert-butyl, n-butyl, isopropyl, hexyl, 2-nitropropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanium and other metal salts and/or ammonium phosphoryl azide compounds in which $R_2$ is a cation are also illustrative of useful compounds.

Preferred for use in the practice of this invention are phosphoryl azide compounds in which $R_1$ and $R_2$ are the same or different and are phenyl or substituted phenyl. In the particularly preferred embodiments of the invention, $R_1$ and $R_2$ are the same or different and are phenyl or phenyl substituted with one or more nitro, alkoxyalkyl, alkylphenyl, alkoxyphenyl, phenoxy, halo, phenyl, phenylalkyl, alkyl or alkoxy groups. Amongst these particularly preferred embodiments, most preferred are those embodiments in which $R_1$ and $R_2$ are the same and are phenyl, phenyl substituted with one or more alkyl, phenyl, phenylalkyl or alkoxy groups, with diphenyl phosphoryl azide being the phosphoryl azide compound of choice.

Aryl phosphoryl azide compounds for use in the particularly preferred embodiments of the invention are those in which $R_1$ and $R_2$ are the same and are phenyl or substituted phenyl wherein permissible substituents are alkyl, alkoxy, or substituted or unsubstituted phenyl where permissible substituents are one or more alkyl or alkoxy substituents.

An effective amount of one or more aryl phosphoryl azide compounds is employed in forming the intimate mixture. In general, the amount of aryl phosphoryl azide compound employed is at least about 0.05 wt % based on the total weight of the mixture. In the preferred embodiments of this invention, the quantity of the one or more aryl phosphoryl azide compound employed is at least about 0.05 wt % to about 5 wt %, based on the total weight of the mixture. In the particularly preferred embodiments of this invention, the wt % of aryl phosphoryl azide compound is in the range of from about 0.1 wt % to about 2 wt %, and amongst these particularly preferred embodiments, those in which the quantity of aryl phosphoryl azide compound employed is from about 0.5 wt % to about 1 wt % based on the total weight of the mixture are most preferred.

Polymers which are useful in the conduct of this invention are polyamides and polyesters. Illustrative of useful polyamides are those characterized by the presence of recurring carbonamide groups as an integral part of the polymer chain which are separated from one another by at least two carbon atoms. These polyamides are those prepared by reaction of diamines and diacids having the recurring unit represented by the general formula:

in which R is an alkylene group of at least about two carbon atoms or arylene of at least about 6 carbon atoms, preferably alkylene having from about 2 to about 10 carbon atoms or phenylene, and $R^1$ is R or aryl. Exemplary of such materials are poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly (decamethylene azelamide) (nylon 10.9), poly(decamethylene sebacamide) (nylon 10,10), poly[bis(4-amino cyclohexyl)methane-1,10-decanecarboxamide)] (Quiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide). The particularly preferred polyamide is polycaprolactam.

The particular polyester chosen for use can be a homo-polyester or a co-polyester, or mixtures thereof as desired. Polyesters are normally prepared by the condensation of an organic dicarboxylic acid and an organic diol, and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to 12 carbon atoms. Such aromatic diols include bis-(p-hydroxyphenyl)-methane; 1,2-(bis-(p-hydroxyphenyl)ethane; 1-phenyl-(bis-(p-hydroxyphenyl)-methane; dipheny-(bis-(p-hydroxyphenyl)-methane; 2,2-bis(4'-hydroxy-3'-dimethylphenyl)propane; 1,1- or 2,2-(bis(p-hydroxyphenyl)-butane; 1,1-dichloro-or 1,1,1-trichloro-2,2-(bis(p-hydroxyphenyl)-ethane; 1,1-(bis(p-hydroxyphenyl)-cyclopentane; 2,2-(bis-(p-hydroxyphenyl)propane (bisphenol A): 1,1-(bis-(p-hydroxyphenyl)cyclohexane (bisphenol C): p-xylene glycol 2,5-dichloro-p-xylylene glycol; p-xylene $\alpha$, $\beta$-diol: and the like.

Suitable cycloaliphatic diols include those having from about 5 to about 8 carbon atoms. Exemplary of such useful cycloaliphatic diols are 1,4-dihydroxy cyclohexane: 1,4-dihydroxy methylcyclohexane: 1,3-dihydroxycycloheptane 1,5-dihydroxycyclooctane: 1,4-cyclohexane dimethanol; and the like. Polyesters which are derived from aliphatic diols are preferred for use in this invention. Useful and preferred aliphatic diols include those having from about 2 to about 12 carbon atoms, with those having from about 2 to about 6 carbon atoms being particularly preferred. Illustrative of such preferred diol precursors are 1,2- or 1,3-propylene glycol: ethylene glycol, neopentyl glycol, pentyl glycol, 1,6-hexanediol, 1,4-butanediol and geometrical isomers thereof. Propylene glycol, ethylene glycol and 1,4-butanediol are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cycloaliphatic dicarboxylic acids. Illustrative of aliphatic dicarboxylic acids which can be used in this invention are those having from about 2 to about 5 carbon atoms, as for example, oxalic acid, malonic acid, dimethylmalonic acid, succinic acid, octadecylsuccinic acid, pimelic acid, adipic acid, trimethyladipic acid, sebacic acid, subric acid, azelaic acid and dimeric acids (dimerisation products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexane-dicarboxylic acid, 1,3- and 1,4dicarboxymethylcyclohexane and 4,4'-dicyclohexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-, 1,4-, , 2,6 or 2,7-naphthalenedicarboxylic acid, 4,4'-diphenyldicarboxylic acid, 4,4'-diphenylsulphonedicarboxylic acid, 1,1,3-trimethyl-5-carboxy-3-(p-carboxy-phenyl)-indane, diphenyl ether 4,4'-dicarboxylic acid bis-p(carboxyphenyl) methane and the like. Of the aforementioned aromatic dicarboxylic acids based on a benzene ring such as terephthalic acid, isophthalic acid orthophthalic acid are preferred for use and amongst these preferred acid precursors, terephthalic acid is particularly preferred.

Preferred polyester for use in the practice of this invention, poly(ethylene terephthalate), poly(butylene terephthalate), and poly(1,4-cyclohexane dimethylene terephthalate), are the polyesters of choice. Among these polyesters of choice, poly(ethylene terephthalate) is most preferred.

The relative amounts of polyamide and polyester in said composition may vary widely. In general, the amount of polyester in said mixture will vary from about 10 to about 90% by wgt and the amount of polyamide in said mixture will vary from about 10 to about 90% by wgt, based on the total weight of polyamide and polyester in said mixture. In the preferred embodiments of the invention, the amount of polyester in the mixture will vary from about 20 to about 80% by weight and the amount of polyamide will vary from about 20 to about 80% by weight on the afore-mentioned basis. In the more preferred embodiments of the invention, the amount of polyester in the mixture will vary from about 50 to about 50% by weight and the amount of polyamide will vary from about 50 to about 50% by weight on the aforementioned basis.

Various other optional ingredients, which are normally included in polymer compositions, may be added to the mixture at an appropriate time during the conduct of the process. For example, these optional ingredients can be added either prior to or after melting of the polyamides in the first step of the process of this invention; or after the conduct of the second step in which the desired melt index, melt viscosity and melt elasticity have been attained. Such optional components include fillers, plasticizers, impact modifiers, colorants, mold release satisfy agents, antioxidants, ultraviolet light stabilizers, lubricants, antistatic agents, fire retardants, and the like. These optional components are well known to those of skill in the art, accordingly, only the preferred optional components will be described herein in detail.

The polyamide/polyester blends prepared in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well-known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 wt % based on the total weight of the polymer and phosphite components, and in the particularly preferred embodiment is in the range of from about 30 to about 90 wt % on the same basis.

It is also very desirable to include a plasticizer of the type known in the art for use with polymer composition. Useful plasticizers will depend on various factors including the type of polyamide and polyester employed, and include caprolactam, mixtures of ortho and paratoluene ethyl sulfonamides, and the like.

Polyamides/polyester blends formed in accordance with this invention are useful in the fabrication of films. Films produced in accordance with this invention may be employed as packaging materials, incorporated in laminates and diffusion barrier, cooking bags, cable insulation and the like.

Such modified polyamide/polyester blends of this invention are also extremely useful as tire cord in pneumatic tires, and the products, filaments, fibers and yarn produced therewith have significantly better properties than other polymers. For example, the fibers have increased tenacity, greater breaking strength and greater resistance to depolymerization. When yarn produced from a modified polyamides prepared by the process of this invention is made into tire cord and the cord is then used for pneumatic tire reinforcement, the life span of the tire is markedly increased over that of tires reinforced with cord made from other polymers. Polyamides/polyester blends of this invention are thermoplastic materials from which molded articles of manufacture having valuable properties can be produced by the conventional shaping processes, such as casting, injection molding and extruding. Examples of such moldings are components for technical equipment, apparatus castings, household equipment, sports equipments, components for the electrical and electronics industries and electrically insulations, car components, circuits, fibers and semifinished products which can be shaped by machining. The use of the materials for coating articles by means of immersion or powder coating processes is also possible as is their use as hot-melt adhesives. The polymer compositions according to the invention are outstandingly suitable for specific applications of all types since their spectrum of properties can be modified in the desired direction in manifold ways.

Compositions prepared in accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, as for example, by lacquering or by the application of protective films. The compositions prepared in accordance with the process of this invention can be made into films with or without fillers, which may be transparent or translucent.

The foregoing detailed description of the invention has been given for clarity of understanding only, and no unnecessary limitations are to be understood therefrom. The invention is not limited to the exact details herein shown and described, and will encompass obvious modifications which will occur to those skilled in the art in view of the appended claims.

EXAMPLE I (A) Sample Preparation

Commercial grade nylon 6 (8207F from Allied-Signal, Inc.) and polyethylene terephthalate (PET) (0.7 IV from Allied-Signal, Inc.) were freeze ground to an average particle size of less than 2 mm in a conventional grinding mill, mixed to give a nylon 6(85)/PET (15) composition and subsequently vacuum dried at 95° C. The polymer was coated with 1% by weight of diphenylphosphoryl zide (DPPA) through a solution coating method. The coated granular resin was dried and extruded. The extrusion was carried out on a 1 inch single screw extruder, with fluted mixing sections and a die zone temperature of 280° C. The extruded strand was quenched in a water bath and subsequently pelletized.

(B) Thermal Analysis

A DuPont 9900 differential scanning calorimeter (DSC) was used in argon atmosphere. A sample of about 0mg was crimped in an aluminum pan heated at 0° C/min. After the initial heat to 300° C. (5 min hold), the samples were cooled and reheated under the same conditions. The results are set forth in the following Table I.

TABLE I

| Sample Description | Initial Tm, °C. | Reheat Tm, °C. (5 min) | Reheat Tm, °C. (10 min) | Reheat Tm, °C. (15 min) |
|---|---|---|---|---|
| Nylon 6 (85)/PET (15) - Control | 224 + 250<br>224 + 248<br>224 + 248 | 223 + 249 | | 221 + 247<br>221 + 241<br>220 + 245 |
| Nylon 6 (85)/PET (15) - 1% DPPA | 224 + 249<br>220 + 250<br>221 + 250<br>221 + 249<br>220 + 250 | 219 + 244 | | 217 + 243<br>214 + 241<br>211 + 240 |

The "as extruded" samples upon initial heating show a 3–4° C. lowering in the Tm of nylon 6 when DPPA is present. Reheat after 5–10 min of thermal treatment at 300° C. in the DSC, shows a 4–5° C. lowering in the Tm's of nylon 6 as well as PET. A 15 min treatment at 300° C., decreases the Tm of PET by 4–5° C. but as much as 10° C. lowering the Tm of nylon 6, when DPPA is present. A depression in the Tm of both the homopolymers is attributed to a partial copolymerization of the random type. This is accelerated by DPPA for the nylon 6/PET system. This type of molecular mixing between the nylon and PET chains revealed by a lowering of their individual Tm's, is referred to as enhanced compatibility between nylon 6 and PET.

What is claimed is:

1. A process for improving the properties of a polyester/polyamide blend which comprises the steps of:
   (a) forming an intimate mixture of at least one polyester homopolymer at least one polyamide and an amount of one or more aryl phosphoryl azide compounds sufficient to enhance the compatibility of said polyester and said polyamide in a polyester polyamide blend, said compounds of the formula:

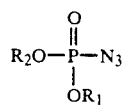

wherein:
   $R_1$ is selected form the group consisting of phenyl and phenyl substituted with one or more substitutents which are inert under process conditions; and
   $R_2$ is selected from the group consisting of haloalkyl, alkyl, phenyl, phenyl substituted with one or more substituents which are inert under process conditions, a metal or non-metal cation and hydrogen; and
   (b) heating said mixture for a period of time and at a temperature sufficient to decrease the melting points of said polyester and polyamide in said mixture.

2. A process according to claim 1 wherein said heating step is conducted in two stages, the first of which is at a temperature from about 265° C. to about 315° C. and the second of which is at a temperature of from about 240° C. to about 315° C.

3. A process according to claim 2 wherein said first and second stages are conducted at temperatures from about 295° C. to about 305° C.

4. A process according to claim 1 wherein said amount is from about 0.05 to about 10 wt %.

5. A process according to claim 4 wherein said amount is from about 0.5 to about 10 wt %.

6. A process according to claim 5 wherein said amount is from about 0.2 to about 2 wt %.

7. A process according to claim 1 wherein said mixture is heated in the absence or substantial absence of water.

8. A process according to claim 1 wherein said polyester is poly(ethylene terephthalate), poly(butylene terephthalate) or poly(1,4-cyclohexane dimethylene terephthalate).

9. A process according to claim 8 wherein said mixture is a molten mixture.

10. A process according to claim 9 wherein said polyamide is polycaprolactam or poly(hexamethylene adipamide).

11. A process according to claim 10 wherein said polyamide is polycaprolactam,

12. A process according to claim 11 wherein said mixture is heated at a temperature of from 265° C. to about 315° C.

13. A process according to claim 8 wherein said polymer mixture is heated for a period of time of from about 2 to about 20 minutes.

14. A process according to claim 13 wherein said period of time is from about 2 to about 10 minutes.

15. A process according to claim 1 wherein $R_1$ and $R_2$ are the same or different and ar phenyl or substituted phenyl.

16. A process according to claim 15 wherein Rhd 1 and $R_2$ are the same or different and are phenyl or phenyl substituted with one or more alkyl, halo, nitro, phenyl, phenoxy, alkylphenyl, alkoxyphenyl, alkoxyalkyl, phenylalkyl or alkoxy groups.

17. A process according to claim 16 wherein $R_1$ and $R_2$ are the same or different and are phenyl or phenyl substituted with one or more phenyl, alkyl, alkoxy or phenylalkyl groups.

18. A process according to claim 17 wherein $R_1$ and $R_2$ are the same or different and are phenyl or phenyl substituted with one or more alkyl or alkoxy groups.

19. A process according to claim 8 wherein said polyester is poly(ethylene terephthalate).

20. A process according to claim 8 wherein the amount of polyester in said mixture is from about 10 to about 50% by weight, and the amount of polyamide in said mixture is from about 50 to about 90% by weight, based on the total weight of polyester and polyamide in said mixture.

21. A process according to claim 20 wherein the amount of polyester in said mixture is from about 15 to about 45% by weight and the amount of polyamide is from about 55 to about 85% by weight.

22. A process according to claim 21 wherein the amount of polyester in said mixture is from about 20 to about 40% by weight and the amount of polyamide is from about 60 to about 80% by weight.

23. A process according to claim 10 wherein said polyamide is poly(hexamethylene adipamide).

* * * * *